United States Patent [19]

Lutz

[11] 3,802,588
[45] Apr. 9, 1974

[54] ARTICLE HANDLING SYSTEM
[76] Inventor: David E. Lutz, 330 Washington Ln., Carlisle, Pa. 17013
[22] Filed: July 20, 1971
[21] Appl. No.: 169,569

[52] U.S. Cl................................ 214/519, 198/85
[51] Int. Cl........................ B60p 1/00, B65g 37/00
[58] Field of Search........ 198/85, 19; 214/518, 519, 214/16.1 CD, 38 CC

[56] References Cited
UNITED STATES PATENTS
| 3,559,831 | 2/1971 | Weston | 214/518 |
| 2,903,120 | 9/1959 | Thomas | 214/16.1 CD |
| 2,201,939 | 5/1940 | Auger | 214/16.1 CD |
| 1,775,799 | 9/1930 | Young | 214/16.1 CD |
| 2,825,600 | 3/1958 | Macomber | 214/38 CC |

FOREIGN PATENTS OR APPLICATIONS
| 74,243 | 11/1960 | France | 214/16.1 CD |

Primary Examiner—Edward A. Sroka
Attorney, Agent, or Firm—Edward E. Dyson; John J. Byrne

[57] ABSTRACT

An article handling system for trucks or tractor-drawn trailers which will deliver a container or the like to the rear opening of the truck from a designated position thereon without having to remove other containers from the truck.

9 Claims, 19 Drawing Figures

ARTICLE HANDLING SYSTEM

This invention relates to an article handling system, and more particularly to a system for shifting and orienting containers within the confines of a truck or tractor-drawn trailer body.

This invention is concerned with truck-mounted mechanized article handling systems which may be easily fitted to existing truck bodies, including tractor-drawn trailer bodies. The mechanized system is particularly adapted for use with standarized containers although it is to be understood that the invention is not limited specifically thereto. The system of this invention is designed to facilitate the general loading and unloading of the containers, but more importantly a primary purpose of the system is to permit access to a particular container regardless of its position on the truck relative to the rear opening without having to remove other containers from the truck.

A number of systems are known in the prior art for facilitating the general loading and unloading of the contents of a truck. Generally, these systems take the form of roller conveyors, pushing and pulling power elements or the like, and do not permit access to a container at the forward end of the truck without removing other containers. It is known to use an endless power conveyor on a truck body which is designed to deliver a particular container to the rear of the truck. However, such systems are impractical from a cost standpoint in that entirely too much free space must be allowed for the containers on the conveyor to make the turns around the sharp corners of the truck body. Further, the mechanism of the conveyor itself has generally been of a rather bulky construction further reducing the space that is available for the hauling of cargo. The system of this invention permits the carrier to maximize the usage of the space within the truck body.

Further, in some of the prior art systems the container itself must be of a particular design and many times is required to be specially fitted with dollies or have other miscellaneous hardware attached thereto which is only useful when used with the particular mechanized system for which it was originally adapted. The mechanized system of this invention employs supports in the form of wheeled trays upon which any type of container may be placed. It is particularly adapted for standarized containers having pallet bases compatible for use with fork lift loaders. Standardized containers are desirable in that they facilitate the use of the optimum amount of space in a vehicle body and are more suitable for stacking.

The basic concept under which the mechanized system of this invention operates involves the sectioning of the truck body into a plurality of contiguous, generally square areas aligned in two longitudinal rows. Each of the squares receives a container with the exception of one which is left blank. By subjecting the two rows of containers to a plurality of sequenced rectilinear movements using the blank space, a particular container may be brought to a particular location on the floor of the truck body without having to remove any of the containers from the truck, thereby saving many man hours in unloading the truck. Wear and tear on the truck body is minimized in that, since a container is delivered to the rear opening mechanically, a fork lift need not enter the truck for the removal of a container located at the front.

It is an objective of this invention to provide a mechanized article handling system for truck or tractor-drawn trailer bodies of compact design and adaptable to existing truck bodies.

It is a further objective of this invention to employ an article handling system which, upon actuating suitable controls, will deliver a designated container to a particular area of the truck.

It is a further objective of this invention to provide a mechanized article handling system for trucks or the like wherein the mechanized system consumes virtually none of the interior volume of the truck body and shifts the container in a plurality of rectilinear movements in such a manner that the maximum volume of the truck body may be utilized for the handling of income-producing freight.

It is a further objective of this invention to provide a mechanized article handling system particularly adaptable for use with standardized containers but requiring no particular modifications to the containers in order to render them usable with the mechanized system.

It is a further objective of this invention to provide a mechanized article handling system which can be sold in component form and can be placed in existing truck bodies without compromising the structural integrity of the body.

It is a further objective of this invention to provide a hydraulic power unit which forms a component of the mechanized system, and which provides a maximum of rectilinear movement relative to its compact design.

Generally, the objectives of this invention are accomplished by placing four reciprocating drive units in the floor of a truck body having two longitudinal rows of wheeled trays thereon for receiving containers. Two of the drive units effect longitudinal movement of the longitudinal rows, each comprising an endless chain having driving dogs thereon which engage the underside of the wheeled trays. Transverse reciprocating drive units are provided at the front and rear ends of the truck body and comprise compact hydraulic power units which drive a shuttle adapted to engage the underside of the wheeled trays to effect movement of the wheeled trays one tray length in a direction widthwise of the truck body, or from one longitudinal row to the other longitudinal row. As mentioned earlier, the general concept involves sectioning the truck body into a plurality of squares as represented by the trays but leaving one space void. The rows of trays are shifted in rectilinear movements utilizing the blank space to eventually deliver a designated container to a predetermined location on the truck body.

The drive units are embedded in the truck floor and are flush with the surface thereof such that if the dollies or trays are removed, the truck can be used for general unmechanized cargo shipment.

These and other objectives of the invention will become more apparent to those skilled in the art by reference to the following detailed description when viewed in light of the accompanying drawings wherein:

GENERAL DESCRIPTION

Figure 1:
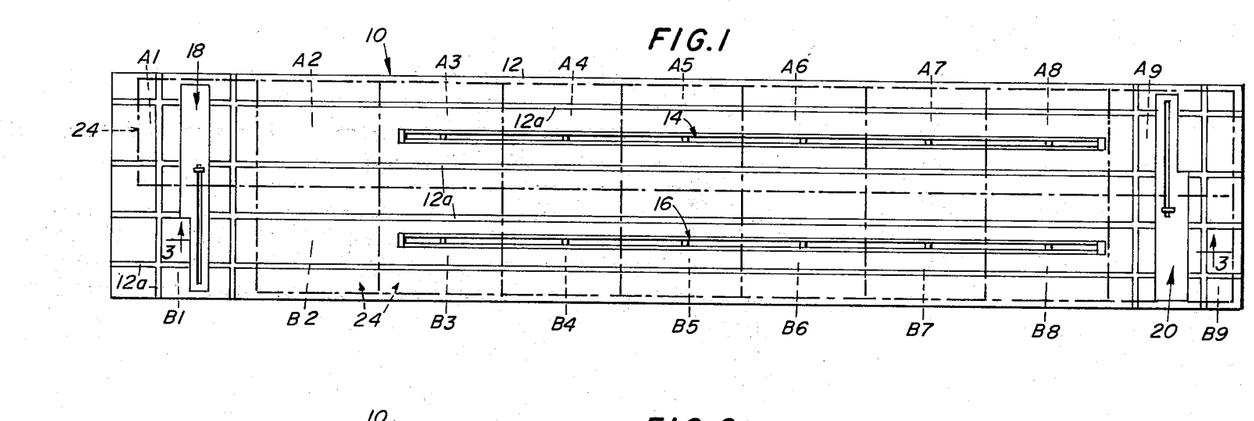
FIG. 1 is a schematic plan view of the article handling system of this invention.
Figure 2:
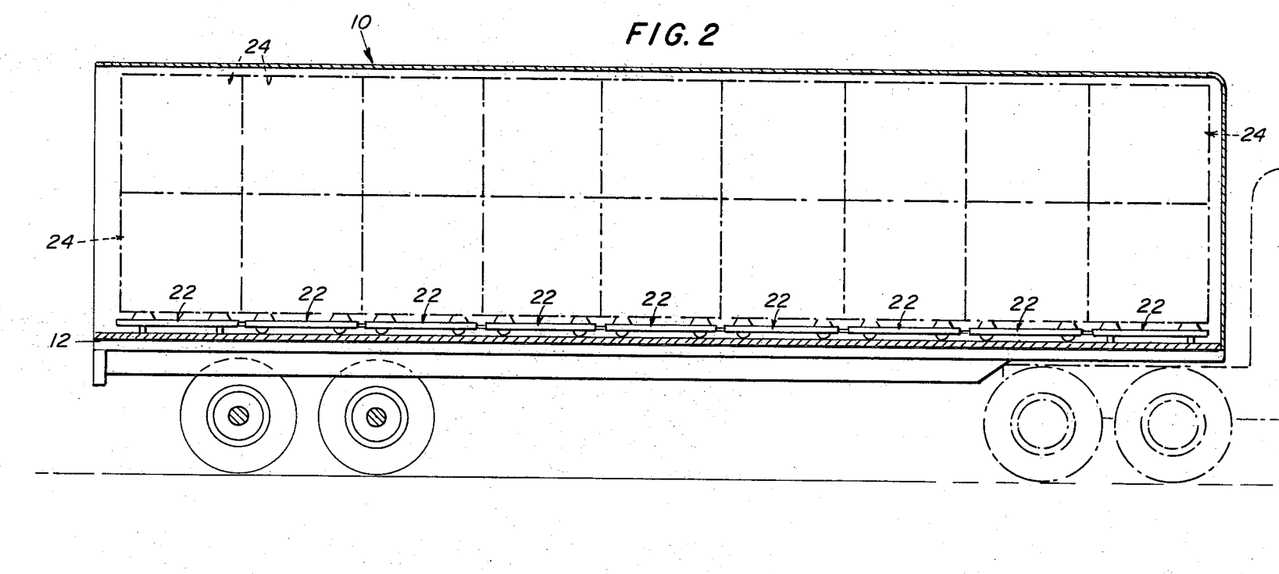
FIG. 2 is a schematic elevational view of the article handling system of this invention.

The concept upon which this invention is based can best be understood with reference to FIGS. 1 and 2 wherein 10 generally indicates an enclosed truck body; in this case a tractor-drawn trailer. The trailer includes a floor 12 having recesses in which are seated longitudinal drive units 14 and 16 and transverse drive units 18 and 20, each of which will be described in greater detail hereinafter. As can be best seen in FIG. 1, the trailer is sectioned into squares aligned in two longitudinal rows, A and B. The squares in the two rows are numbered A1 through A9 and B1 through B9, respectively. Each of the squares is occupied by a tray 22 with the exception of one square, in this case square B1, which is left vacant. It is this vacant area, of course, that permits the trays to be shifted in transverse and longitudinal rectilinear movements as will hereinafter be more fully described. Each of the trays receive a standardized container 24 which can be stacked vertically, two upon a tray, to more fully maximize the usage of the space within the trailer body.

Referring now to FIG. 1, the indexing of the containers one square will now be described. Since the blank space is B1 and is in the area of the transverse drive means 18, that drive means will be actuated first to move the container in the space A1 the distance of the length of one tray to the position B1. In step two the longitudinal drive means 14 is actuated to move the trays and containers in stations A2 through A9 to stations A1 through A8. As will be described hereinafter the trays are coupled together by suitable coupling means such that the containers in the longitudinal rows A or B will move together. After step two station A9 will be vacant whereupon the transverse drive means 20 is actuated in step three to move the container in the space B9 to space A9 after which, in step four, the longitudinal drive means 16 is actuated to move the containers in stations B1 through B8 to stations B2 through B9. This sequence is defined as indexing one position or one square. One complete circuit is defined as indexing until the original arrangement is regained. For a 17-tray load one circuit (original container returned to starting position) requires 17 indexing sequences of four steps each. Thus, it can be seen that by performing a certain number of indexing sequences a particular container, for example, one occupying the position in station A9 at the front end of the trailer can be delivered to the position A1 at the rear end of the trailer where it can be conveniently removed by a fork lift truck or the like without having to remove any of the other containers from the trailer. It is also to be observed that this system permits the utilization of a maximum amount of space within the truck body. This is contrary to endless conveyor systems of the prior art wherein a large amount of wasted space had to be allowed at each end of the trailer to permit the containers to make the turns.

It must be understood that the longitudinal transverse drive means of this invention can move the containers in the reverse direction. That is, assuming station B1 to be vacant, containers in stations B2 through B9 can be shifted to stations B1 through B8 as the first step in a particular indexing sequence, and so on.

LONGITUDINAL DRIVE UNIT

Figure 3:
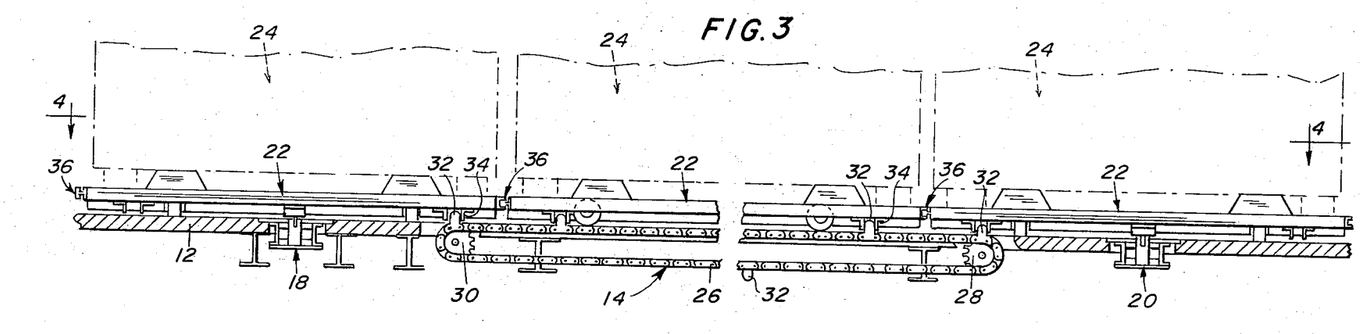
FIG. 3 is a sectional view taken on line 3—3 of FIG. 1.

The longitudinal drive means 14 and 16 are identical, therefore only one will be described, drive means 14, which is best shown in FIG. 3. The drive means includes an endless chain 26 mounted on rotatable sprockets 28 and 30, one of which is driven by a suitable drive means such as an electric motor or the like, not shown. Driving dogs 32 are attached to the chain and are spaced along the length thereof to correspond to the spacing of longitudinal drive slots 34 on the underside of the wheeled trays 22. There are two longitudinal drive slots defined by pairs of downwardly extending flanges on each tray. The drive chain is of such length that the dogs are in driving engagement with each of the trays in a row. The trays may be coupled together by coupling means 36 such that the drive means by engaging and moving only one tray in the longitudinal direction will cause movement of the other trays in that row. The drive means for the chain will have a timing switch, a tray-activated switch, or other timing control means to insure that the drive chain will be actuated only long enough to move the row of trays one tray length for each indexing sequence. The width of the longitudinal drive slots is greater than the width of the driving dogs 32 just to the extent necessary to permit the dogs to sweep into the drive slots upon initial engagement and to release from the drive slots as the chain follows the curvilinear path around the sprocket.

Figure 4:
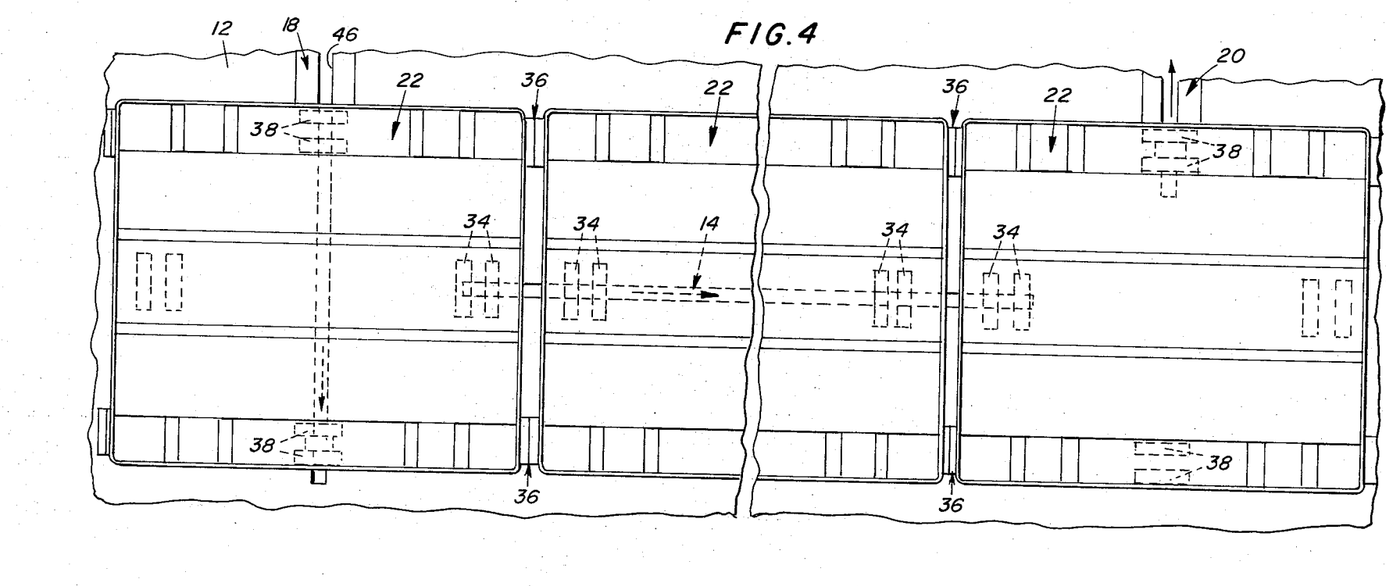
FIG. 4 is a plan view taken on line 4—4 of FIG. 3.

As best seen in FIG. 4, the trays also include transverse drive slots 38 which receive a detent on a traveling shuttle in the transverse drive means.

TRANSVERSE DRIVE UNIT

The transverse drive means is shown in detail in FIGS. 5 through 13 and since both of the transverse drives are identical, only transverse drive unit 18 will be described in detail.

Figure 5:
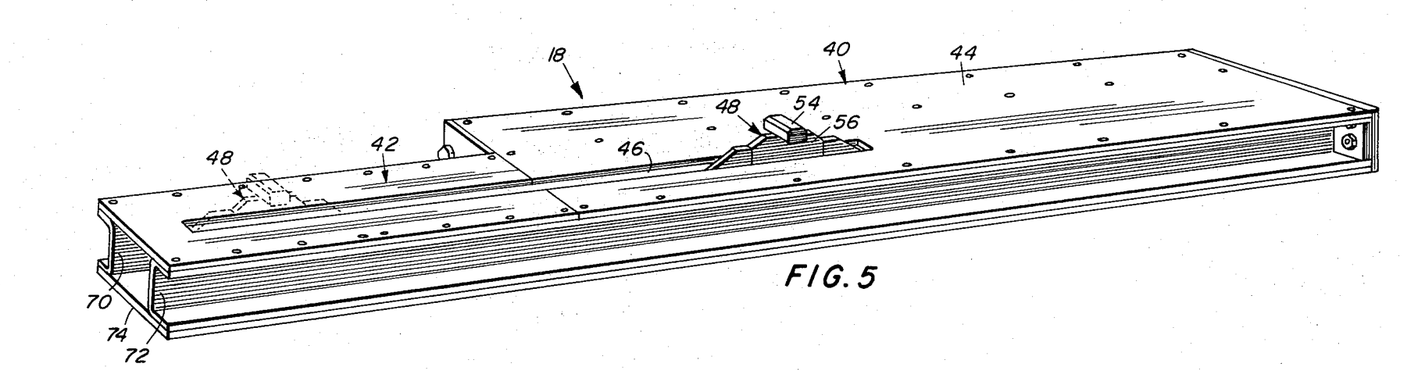
FIG. 5 is a perspective view of the transverse drive unit of this invention.

The transverse drive unit 18 comprises a housing 40 having an extension 42 thereon of a width narrower than that of the main part of the housing to accommodate the shuttle extension as will be more fully understood hereinafter. Housing 40 includes a top wall 44 having a slot 46 therein which extends through into the extension 42. The top wall 44 is flush with the truck floor when the drive unit is in operable position. The slot permits rectilinear movement of a shuttle 48 which is attached to the outer end of a piston rod 50 of a hydraulic actuator 52. The shuttle includes a detent 54 which is affixed to the top of a bevelled surface member 56 which in turn is slidably received in a holder 59 which is affixed to the outer end of the piston rod 50. The member 56 and the detent 54 are spring urged to the position shown but will move downwardly against the action of the spring when depressed, such as when the detent 54 is driven into one of the transverse drive slots 38 of the trays 22. The bevelled surface member 56 engages the downwardly extending flanges defining the drive slot 38 causing the depression of the member and the detent, the latter of which is also bevelled, thereby permitting the detent to ride under the flange and the seat in the transverse drive slot 38. The actuator is then retracted or extended depending upon the position of the particular tray when engaged and upon which direction it is to be moved. Once engaged, the detent 54 cannot be disengaged from the drive slot by the extension or retraction movement of the shuttle due to the configuration thereof, and is freed only when the tray with which it is engaged is moved in the longitudinal direction of the truck, away from the detent and shuttle. Longitudinal movement is permitted since the slots are open ended. It is, of course, to be understood however, that various tripping or locking devices can be employed such that the shuttle can be automatically or manually released irrespective of movement of the tray.

Figure 6:
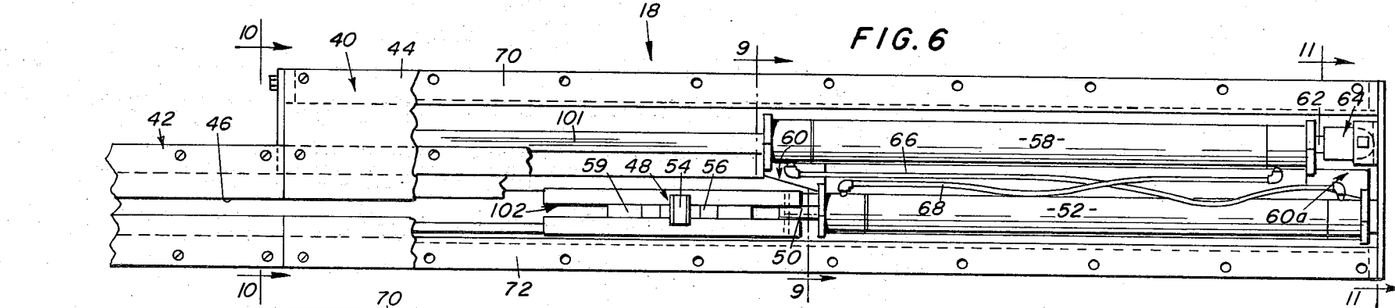
FIG. 6 is a plan view of the transverse drive unit of this invention with parts broken away and showing the unit in retracted position.
Figure 7:
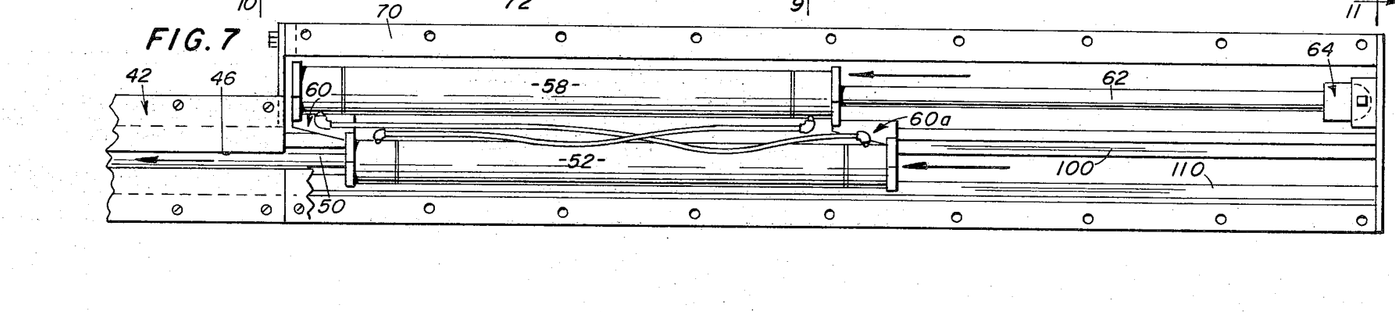
FIG. 7 is a plan view of the transverse drive unit of this invention with parts broken away and with the unit in extended position.
Figure 8:
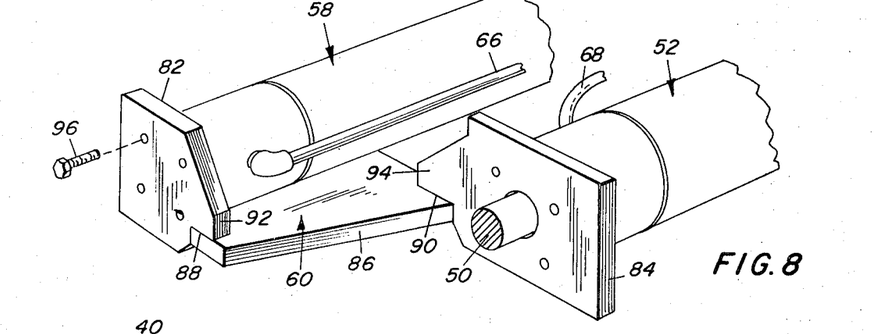
FIG. 8 is a perspective view of the connecting means for the hydraulic actuators of the transverse drive unit.

Referring now to FIGS. 6 and 7 wherein the housing is shown partially broken away, two drive actuators 52 and 58 are shown therein, each comprising a piston and cylinder with the cylinders thereof being joined at each end by connection means 60 and 60a for movement in unison upon actuation. The piston rod 62 of the cylinder 58 is fixedly attached at 64 to one end of the housing 40, and as mentioned earlier, the piston rod 50 of the actuator 52 has the shuttle 48 attached thereto. The actuators 52 and 58 are in fluid communication with each other via lines 66 and 68 and extend and retract simultaneously. Since piston rod 62 is fixed at 64 the cylinder of the actuator 58 will be caused to move relative to the piston therein, and since the actuator 52 is attached to the actuator 58 it will move therewith while at the same time its piston and piston rod are being extended outwardly relative to the cylinder. Hence, for each increment of movement of the combined actuators 52 and 58 the shuttle moves twice as far.

Figure 9:
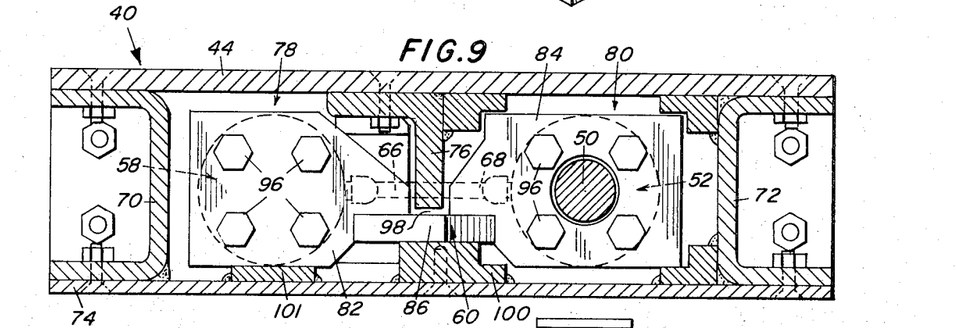
FIG. 9 is a sectional view taken on line 9—9 of FIG. 6.
Figure 10:
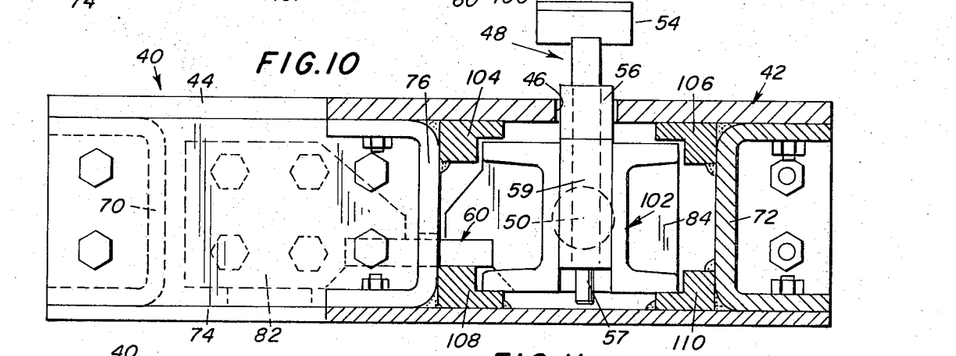
FIG. 10 is a sectional view taken on line 10—10 of FIG. 6.
Figure 11:
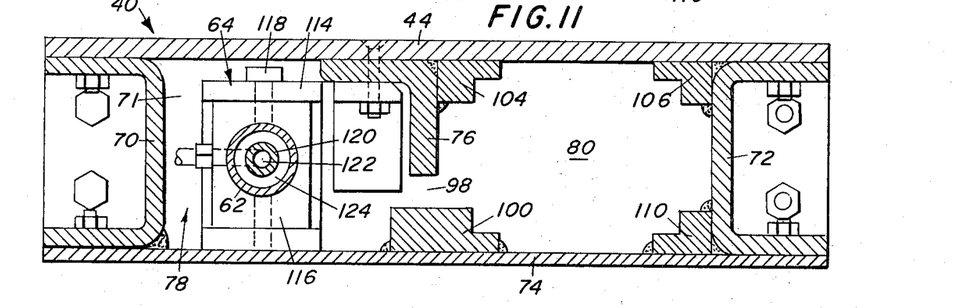
FIG. 11 is a sectional view taken on line 11—11 of FIG. 6.

Referring now to FIGS. 9 through 11 the housing 40 includes a top wall 44, side walls 70 and 72 and a bottom wall 74. An interior center wall 76 divides the main portion of the housing, exclusive of the extension, into two chambers 78 and 80 which receive the hydraulic actuators 58 and 52, respectively. As mentioned in the discussion of FIGS. 6 and 7, the hydraulic actuators 52 and 58 are connected together by a connector means 60 and 60a which are identical and which include end plates 82 and 84 fixedly attached to the ends of hydraulic actuators 58 and 52, respectively. The connector plate 86 maintains the hydraulic actuators in offset spaced parallel relationship, and is received at each end in undercut portions 88 and 90 of extensions 92 and 94, respectively. As shown, the end plates are attached to the actuator ends by means of threaded fasteners 96 or the like.

The center wall 76 includes a horizontally extending slot 98 therein permitting rectilinear movement of the plate 86 upon actuation of the actuators 52 and 58. A bearing surface or block 100 is provided intermediate the width of the housing and extends longitudinally thereof to serve as a bearing support for the plate 86 during movement. Longitudinally extending bearing plate 101 likewise supports the cylinder 58 by means of its end plates 82 riding thereon.

FIG. 10 is a cross-sectional view through the extension portion 42 of the housing 40 and shows the shuttle slide 102 which is guided in a longitudinal path by means of corner-mounted longitudinally extending guide means 104 – 110. The slide 102 receives a body member 59 which, as mentioned earlier, receives the bevelled surface member 56 and detent 54. The detent 54 and member 56 are spring urged to the position shown by a spring internally of the body member and pin 57.

FIG. 11 is a cross-sectional view showing the connection of the piston rod 62 with the end wall 71 of the housing 40. The connector 64 includes a channel member 114 which is fixed to the end wall 71, and a block 116 which is attached to the end of the piston rod 62. A pin 118 extends through the member 114 and block 116 thereby locking the two together. Piston rod 62 is hollow and is provided with an inner concentric conduit 120 which with the rod 62 defines a central fluid passageway 122 and a concentric annular fluid passageway 124.

Figure 12:
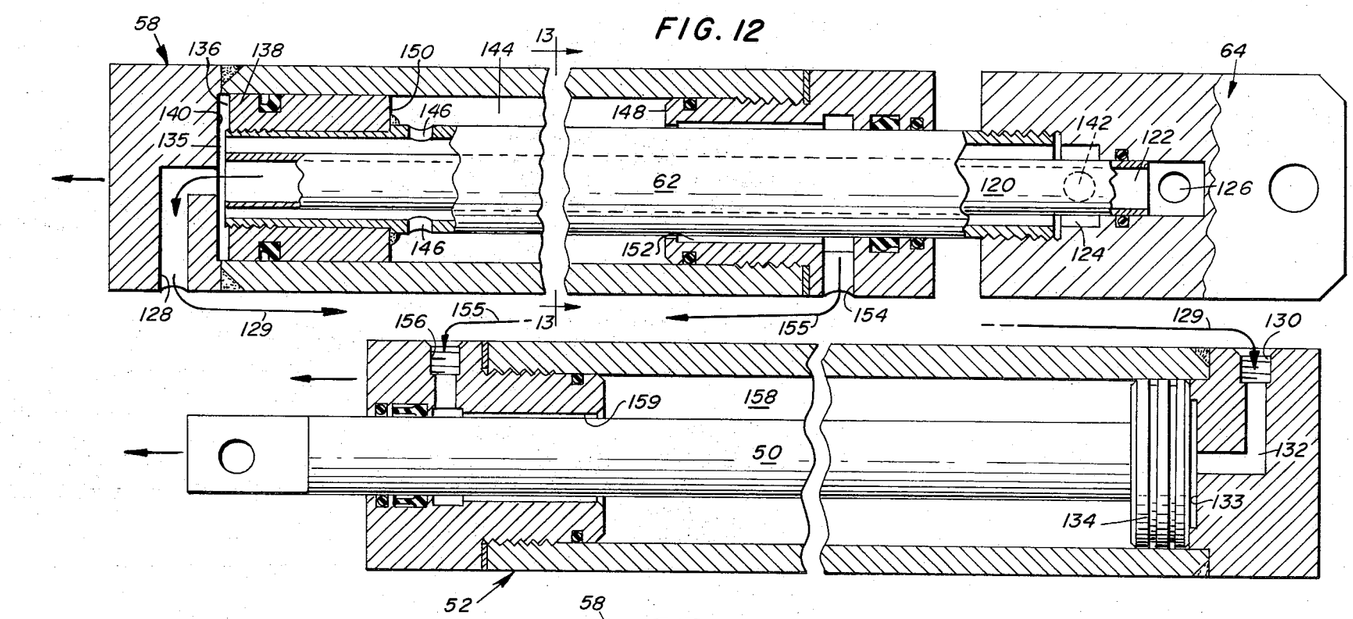
FIG. 12 is a longitudinal sectional view of the hydraulic actuators of the transverse drive unit.
Figure 13:
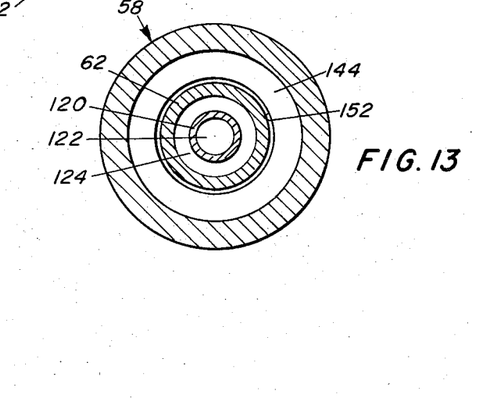
FIG. 13 is a sectional view taken on line 13—13 of FIG. 12.

Referring now to FIGS. 12 and 13, when it is desired to extend the cylinders, fluid under pressure is introduced through port 126 and travels through central passageway 122 and line 129 to port 130 and passageway 132 in actuator 52 to chamber 133 and causes the piston 134 and rod 50 attached thereto to extend. In actuator 58 the fluid in chamber 135 acts on the annular surface 136 of the piston 138 and the end surface 140 of actuator housing to cause the cylinder of the actuator 58 to move to the left relative to the piston since the piston is fixed against movement by the attachment of the piston rod 62 to the end wall of the housing 40. The cylinders, are joined for movement in unison as indicated earlier and the shuttle thereby travels a distance approximately twice as great as the distance travelled by the joined actuators.

In the retraction phase the port 126 is communicated to the reservoir by suitable valve means and fluid under pressure is introduced via port 142 to annular passageway 124 and to annular chamber 144 via radial ports 146 in the piston rod 62. The fluid reacts against the working surface 148 and 150 on the cylinder and piston respectively, causing the piston and cylinder to contract to the position shown in FIG. 12. Simultaneously, fluid under pressure passes through a reduced annular passageway 152, port 154 and line 155 to port 156 whereupon it enters the chamber 158 through annular passageway 159 and acts on the reverse side of the piston 134 to move it to the position shown in FIG. 12. The fluid in the chambers 133 and 135 is exhausted back through the passageways from which it was introduced and through port 126 to tank. Of course, during the extension phase the chambers 144 and 158 are exhausted through port 142. FIG. 13 is a cross-sectional view showing the arrangement of the concentric passageways 122, 124, 144 and 152.

MOBILE TRAYS

Figures 14, 17:
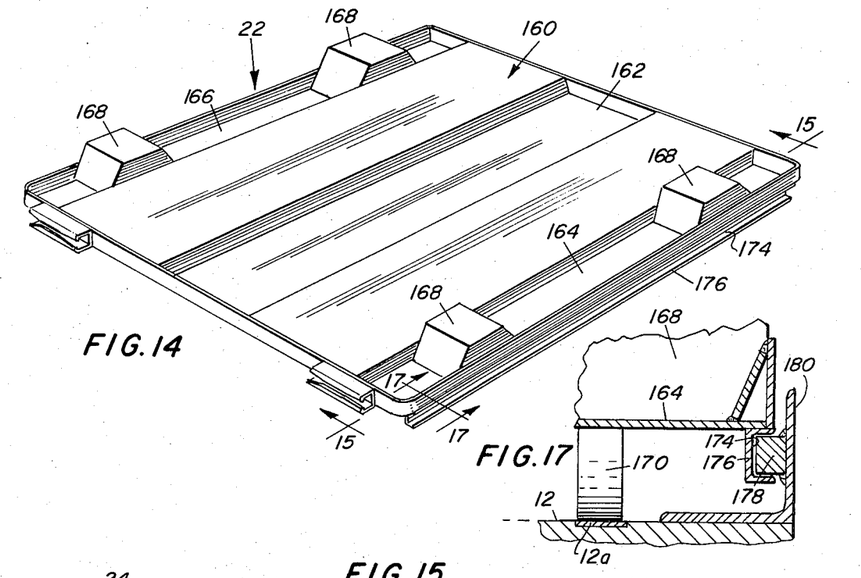
FIG. 14 is a perspective view of a tray unit utilized with the longitudinal transverse drive mechanisms of the article handling system of this invention.
FIG. 17 is a sectional view taken on line 17—17 of FIG. 14.
Figure 15:
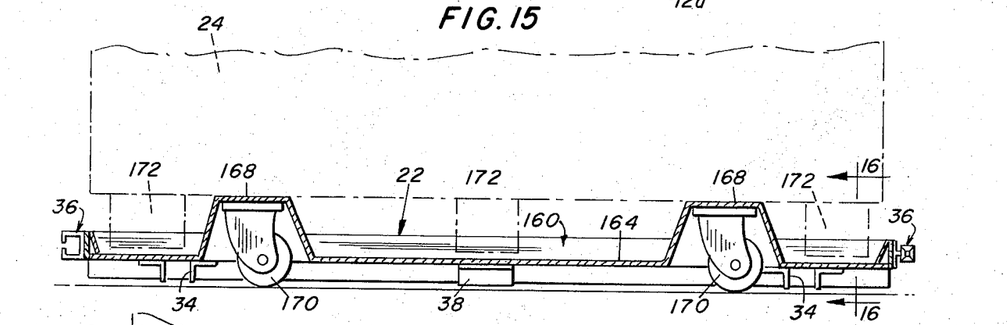
FIG. 15 is a sectional view taken on line 15—15 of FIG. 14.

The trays 22 upon which the containers are placed and which traverse the floor of the truck body are shown in FIGS. 14 through 18 and include a relatively planar body member 160 having a central longitudinal recess 162 and recesses 164 and 166 along the side portions thereof. Arising from the recesses are caster housings 168 which extend above the surface area of the body 160. Casters 170 are mounted within the housings 168 as best seen in FIG. 15. The containers 24 carried by the trays are positioned on the trays in such a manner that they rest on the housings 168 whereby the weight of the container is positioned directly over the casters. The central and side recesses 162 and 164 and 166 receive pallet feet 172 which are attached to the underside of the container 24.

Figures 16, 18, 19:
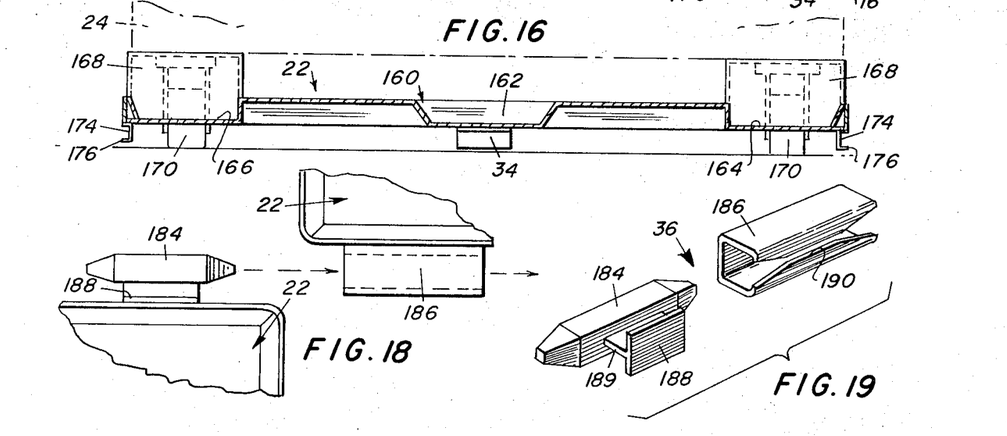
FIG. 16 is a sectional view taken on line 16—16 of FIG. 15.
FIG. 18 is a plan view of the coupling means for the tray units of this invention.
FIG. 19 is a perspective view of the coupling means of FIG. 18.

The trays are of generally square configuration and may be formed of a relatively heavy gauge sheet metal or the like, and are provided along each side thereof with a guide slot 174 which is defined by a generally U-shaped bracket 176. The slot receives a guide rail 178 mounted on an angle 180 positioned longitudinally of the truck bed whereby the trays are guided during the longitudinal movement through stations A1 through A9 and B1 through B9, and are also prevented from moving vertically during shipment. A pair of similar guide rails 178 may be positioned centrally and longitudinally of the truck body to provide added stability during shipment. As best seen in FIG. 17 a strip of metal is placed in the floor of the truck and defines a path for the caster wheels. The drive slots 34 and 38 were described earlier herein. As best seen in FIGS. 18 and 19, the front and rear ends of the trays are provided with the male and female members 184 and 186 which comprise the coupling means 36. The male member comprises a double tapered elongated bar substantially square in cross-section, a pair of which are attached to one end of each tray by means of T bars 188. The female member, of which two are positioned on the opposite end of the tray as best seen in FIG. 14, comprises an elongated hollow channel member of a cross-section similar to that of the male member 184, and has a tapered slot on 190 along the outer face thereof for permitting passage on the horizontal flange 189 of the T bar 188 therethrough. The coupler means holds the trays together during movement longitudinally of the truck body. When the tray is moved transversely thereof by the transverse drive means the male members slide out of the female coupling of the adjacent tray and the female members on the opposite end of the tray being moved pass over the male members of the adjacent tray in the next longitudinal row.

SUMMARY

In operation the truck is loaded by cycling the trays in the manner set forth earlier herein and placing a container onto a vacent tray as it reaches the access opening of the truck. It is not necessary to arrange the cargo in order of geographical unloading points in that, as mentioned earlier, the system permits access to a container located any place in the truck body without having to remove any other containers therefrom. This is done by shifting the trays through a sequence of rectilinear movements by means of the longitudinal and transverse drive means making use of the vacant space as described earlier herein until the desired container or tray reaches the access opening of the truck.

It is to be noted that the transverse drive units are designed to be of a thickness approximating the normal thickness of the floor of a tractor-trailer body to avoid having to modify or otherwise compromise the structural integrity of the longitudinally extending frame members of the body or the fifth wheel connecting member support. The units are, of course, substantially flush with the floor surface.

It is also to be understood that the general concept of this invention utilizing the blank space can be practiced by substituting drive means other than those shown herein, one of which might include the use of a combination hydraulic actuator and flexible cable arrangement using a suitable number of pulleys to arrive at the necessary drive ratio.

In a general manner, while there has been disclosed effective and efficient embodiments of the invention, it should be well understood that the invention is not limited to such embodiments as there might be changes made in the arrangements, disposition, and form of the parts without departing from the principle of the present invention as comprehended within the scope of the accompanying claims.

I claim:

1. In combination with a vehicle having a load supporting floor, an article handling system comprising a plurality of loads of generally rectangular configuration in horizontal cross-section arranged in two closely adjacent longitudinal rows and substantially covering the entire floor area of said vehicle with the exception of a void area at least approximately the size of the area covered by one load, first and second drive means for shifting the loads in said rows in longitudinal directions, third and fourth drive means at each end of said rows for shifting said loads in directions transverse to said longitudinal directions, and means for actuating said drive means in a predetermined sequence utilizing said void space to shift said loads intermittently in a continuous path within the confines of the perimeter of said floor through said two rows, said vehicle floor being substantially uniplanar and having longitudinal and transverse slots therein for receiving said first and second and third and fourth drive means.

2. The combination of claim 1 wherein said first and second drive means are sprocket and chain drives, and including at least one driving dog on said chain for engaging at least one of said containers to shift it in a longitudinal direction.

3. The combination of claim 1 wherein said third and fourth drive means each comprises a fluid actuated assembly.

4. The combination of claim 3 wherein said fluid actuated power assembly comprises a support frame, at least two elongated cylinders connected together in parallel relationship, a piston and rod in each cylinder extending in opposite directions, one of said rods being fixed to said frame, and a container engaging means fixed to the end of the other rod.

5. The combination of claim 4 wherein said container engaging means comprises a detent movable between an up position and a down position and means biasing said detent in the up position.

6. The combination of claim 1 and including mobile means supporting each container.

7. The combination of claim 6 wherein said mobile means comprises substantially planar trays of a dimension to fully underly said containers, wheels on the underside of each tray, raised areas on the top side of said trays directly overlying said wheels, said containers resting on said raised areas.

8. The combination of claim 6 and including coupling means between each mobile support means in each of said longitudinal rows.

9. The combination of claim 1 wherein each of said drive means are recessed into the floor of said vehicle.

* * * * *